United States Patent [19]
Ott et al.

[11] Patent Number: 6,073,970
[45] Date of Patent: Jun. 13, 2000

[54] ROTARY TRANSMISSION LEADTHROUGH FOR HIGH PRESSURES AND HIGH RELATIVE SPEEDS

[75] Inventors: Stephan Ott; Georg Gernand, both of Wiesbaden, Germany

[73] Assignee: GAT Gesellschaft für Antriebstechnik mbH, Germany

[21] Appl. No.: 08/983,256

[22] PCT Filed: May 7, 1997

[86] PCT No.: PCT/DE97/00960

§ 371 Date: Oct. 2, 1998

§ 102(e) Date: Oct. 2, 1998

[87] PCT Pub. No.: WO97/45667

PCT Pub. Date: Dec. 4, 1997

[30] Foreign Application Priority Data

May 24, 1996 [DE] Germany .......................... 196 21 020

[51] Int. Cl.[7] .................................................. F16L 39/04
[52] U.S. Cl. .......................... 285/13; 285/190; 285/123.3
[58] Field of Search .................................. 285/13, 14, 96, 285/106, 190, 123.3

[56] References Cited

U.S. PATENT DOCUMENTS

| | | | |
|---|---|---|---|
| 3,694,008 | 9/1972 | Slator et al. | 285/190 |
| 3,889,983 | 6/1975 | Freize | 285/13 |
| 3,931,853 | 1/1976 | De Putter | 285/190 |
| 4,561,679 | 12/1985 | Choate | 285/190 |
| 4,928,997 | 5/1990 | Reisener et al. | 285/13 |
| 5,052,720 | 10/1991 | Yoda | 285/14 |
| 5,058,927 | 10/1991 | Miwa | 285/14 |
| 5,080,401 | 1/1992 | Stich | 285/13 |
| 5,149,141 | 9/1992 | Newhouse | 285/13 |
| 5,263,312 | 11/1993 | Walker et al. | 285/13 |

*Primary Examiner*—Eric K. Nicholson
*Attorney, Agent, or Firm*—Killworth, Gottman, Hagan & Schaeff, L.L.P.

[57] ABSTRACT

A rotary joint for the transfer of pressurized working fluid between a stationary machine part and a rotating machine part, comprising a housing associated with the stationary machine part and a shaft associated with the rotating machine part. The shaft extends into the housing and is tightly surrounded by at least one bush accommodated in the housing. The inner surface of the bush and the circumferential surface of the shaft are provided with sealing faces which slide against each other. The bush comprises at least one radial fluid feed bore which is connected, via an annular channel encircling the shaft, with at least one radial bore in the shaft for conveying pressurized working fluid through the bush to a fluid duct extending axially in the shaft. The fluid feed bore is also connected with the radial bore in the shaft. The bush is radially resiliently movable within the housing and includes at least one radial bore separate from the fluid feed bore extending to a relieving channel encircling the shaft, the relieving channel being adapted to be loaded with pressurized fluid.

13 Claims, 2 Drawing Sheets

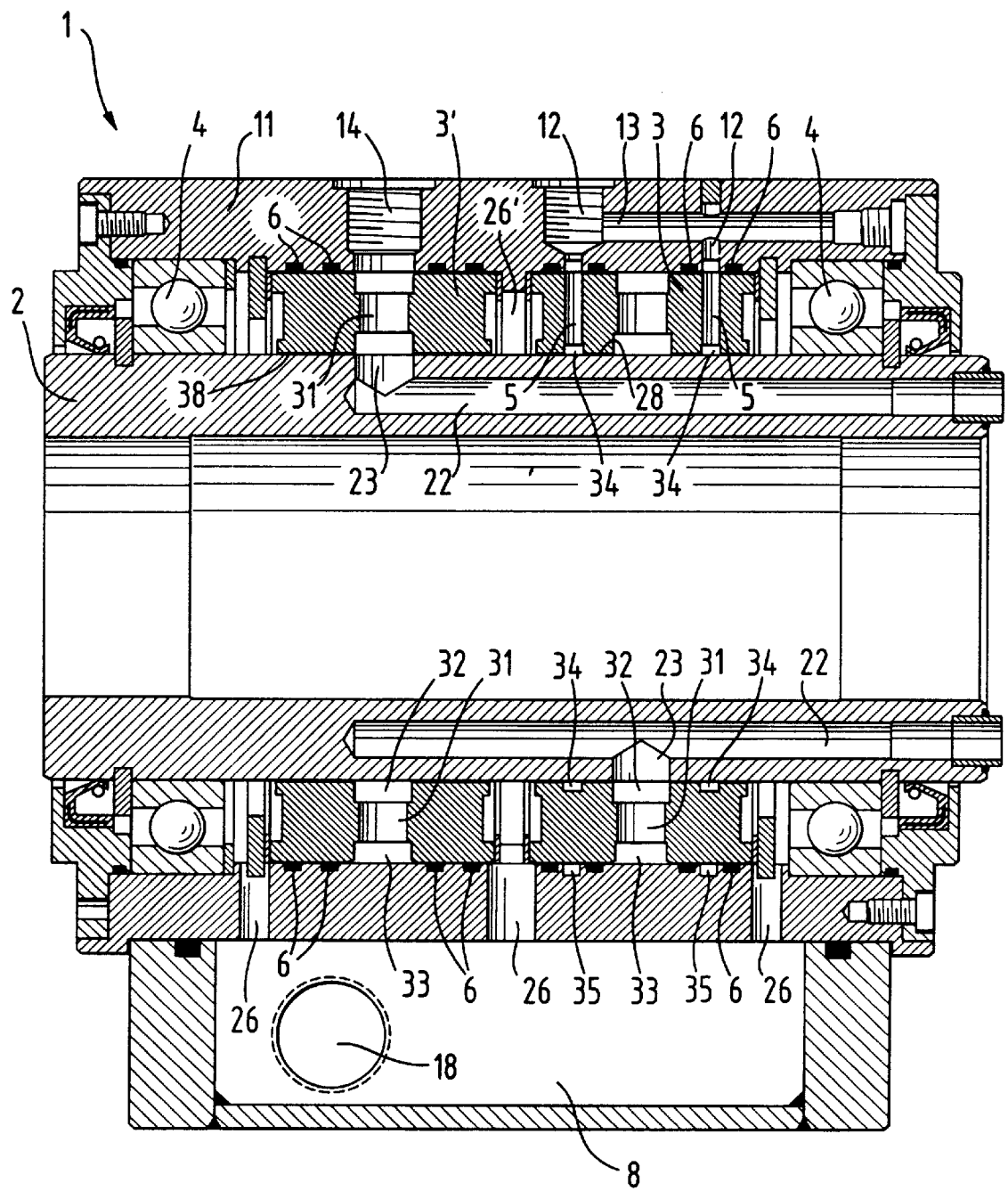

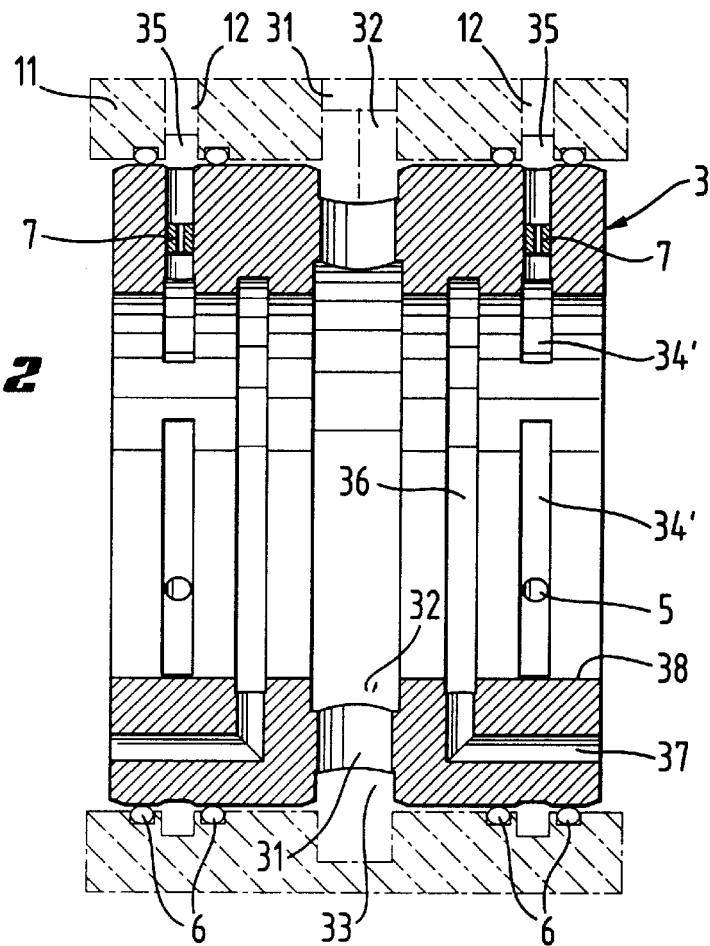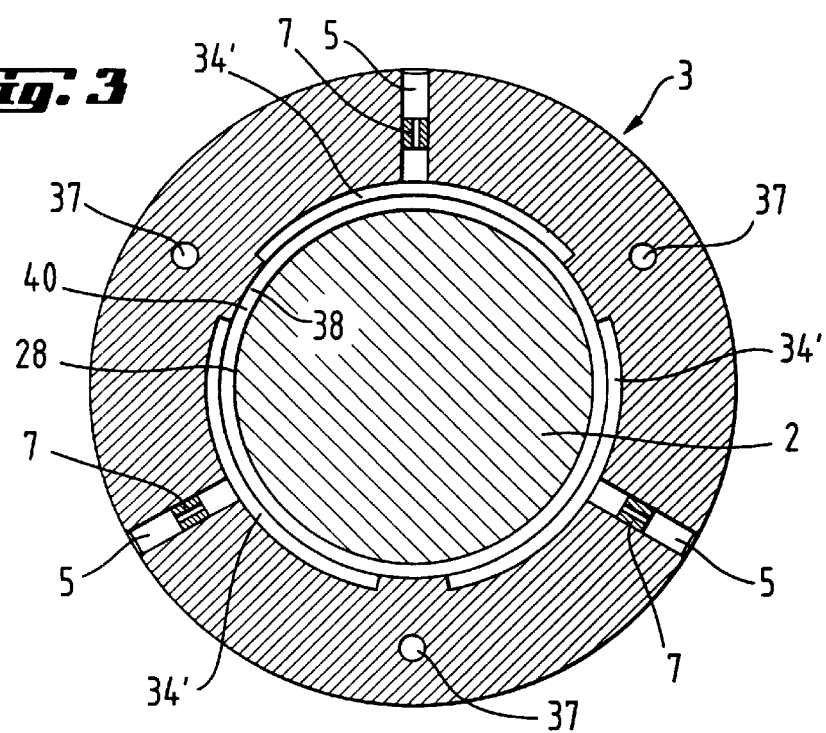

ROTARY TRANSMISSION LEADTHROUGH FOR HIGH PRESSURES AND HIGH RELATIVE SPEEDS

The present invention relates to a rotary joint for the transfer of pressurised working fluid from a stationary to a rotating machine part and/or vice versa, comprising a housing associated with the stationary machine part, a shaft associated with the rotating machine part, which shaft extends in the housing and optionally also therethrough, and at least one bush accommodated in the housing, which bush tightly surrounds the shaft and is mounted sealedly in the housing in such a way as to be radially resiliently movable, the inner surface of the bush and the circumferential surface of the shaft being provided with sealing faces which slide against each other, and the bush comprising at least one radial bore which is connected, via an annular channel encircling the circumferential surface of the shaft and/or the inner surface of the bush, with at least one radial bore in the shaft for conveying pressurised working fluid through the bore in the bush to a fluid duct which extends axially in the shaft and is connected with the radial bore in the shaft.

Such a rotary joint is known, for example, from German Offenlegungsschrift No. 38 06 931. In the case of the known rotary joint, it is a question of so improving a rotary joint with radial gap that said rotary joint operates absolutely reliably under all operating conditions, especially at high speeds and simultaneous high pressures and additionally exhibits the lowest possible degree of leakage. This is achieved by radially displaceable mounting of the bush, whereby manufacturing tolerances and possible vibrations or deviations from the concentric position of the two sliding sealing faces may be compensated without excessive friction occurring between the sliding sealing faces. Although the interposition of the bush, which is mounted radially resiliently and simultaneously sealedly in the housing, makes it possible to increase the rotational speeds and/or diameter of the rotary joints without excessive leakage losses, in many instances of use such rotary joints still remain a speed- and/or shaft diameter-restricting element. With the known solution, it is impossible to achieve reliable, low-friction operation without seizing and with a simultaneously low leakage rate in particular when the operating pressure is not constant, but rather varies between high and lower values. For this reason, there has also in some cases been a move towards the repositioning of corresponding rotary joints onto a shaft extension portion or end, for example, which does not transmit torque and is only slightly loaded and which may accordingly be provided with a tapered diameter. However, the problem then arises of appropriately positioning the ducts extending axially in the shaft or of effecting connection with the axially extending duct portions in the shaft extension zone. The shaft or the rotating machine part thereby becomes substantially more complex. Moreover, from time to time it is necessary to effect transmission of the working fluid in a torque-transmitting shaft portion with a correspondingly large diameter.

In the case of such rotary joints, the so-called sliding sealing faces between shaft and bush are also not provided for the purpose of actually sliding frictionally on each other, but rather there should if possible be provided between these ideally concentric, cylindrical sealing faces a very narrow but uniform gap through which working fluid or lubricant passes and through which there flows as slight as possible a leakage flow. The narrower this gap, however, the more likely it is that direct contact between shaft and bush will arise and, in the worst case, seizing thereof. With larger gap widths, on the other hand, large leakage losses arise, which are no longer acceptable, especially with high pressures and large shaft diameters.

With respect to this prior art, the object of the present invention is to provide a rotary joint with the above-mentioned features, which permits a further increase in shaft diameter, in the relative speeds of the surfaces sliding against each other and/or in the pressures, especially even varying pressures, at which working fluid may be supplied.

This object is achieved in that a relieving device is provided by constructing the bush with at least one radial bore separate from the working fluid feed bore, which radial bore extends to a pressure chamber formed either on the inner surface of the bush or the outer surface of the shaft and may be loaded with fluid pressure independently of the supply of working fluid through the feed bore.

In the sense of the present description, working fluid is a fluid provided for any desired purpose, e.g. hydraulic oil, a rinsing agent, water or compressed air. The term "working fluid" is used here substantially only as a distinction from the relieving fluid, which may, however, be identical to the working fluid. It is also unnecessary for the shaft to be a torque-transmitting component in the conventional sense, but rather "shaft" in this description merely designates a rotating, cylindrical machine part. Moreover, the roles of the rotating and stationary machine parts could even be exchanged, such that the shaft would become the stationary machine part.

In such rotary joints the so-called sliding sealing faces are also not provided for the purpose of actually sliding frictionally on each other, but rather there should if possible be provided between these ideally concentric, cylindrical sealing faces a very narrow but uniform gap through which working fluid or lubricant passes and through which there flows as slight as possible a leakage flow. The narrower this gap, however, the more likely it is that direct contact between shaft and bush will arise and, in the worst case, seizing thereof. With larger gap widths, on the other hand, large leakage losses arise, which are no longer acceptable, especially with high pressures and large shaft diameters.

The pressure chamber formed between the inner surface of the bush and the outer surface of the shaft, which chamber may be loaded with pressure independently of the supply of working fluid into the shaft, ensures a certain expansion of the bush and reduces the contact pressure and friction between the sealing faces sliding on each other even when working fluid is not being supplied or is not under high pressure. In conventional rotary joints, one problem consists, inter alia, in the fact that, although the friction between the sliding sealing faces is still acceptable during the supply of working fluid and at the same time the friction heat arising is also partly conveyed away by the working fluid, the friction and the friction heat arising increase very rapidly if the supply of working fluid is interrupted or the pressure of the working fluid is considerably reduced. In many instances, however, the supply of working fluid is only provided during certain, frequently short periods, the rotating machine part continuing to rotate constantly and the sliding sealing faces thus rubbing against each other.

Through the independent supply of pressurised fluid into the relieving chamber, which is provided in the form of a recess or groove in one or both of the sliding sealing faces, not only is a lubricating film maintained permanently between the sliding sealing faces but also the pressure prevailing in the relieving chamber itself and between the adjacent sliding sealing faces expands the bush slightly and forces the sliding sealing faces so far apart that they barely touch each other and the friction and resultant friction heat are considerably reduced. As in conventional rotary joints, the fluid penetrating between the sliding sealing faces is collected axially externally of the bush in leakage collecting chambers provided accordingly and returned to a leakage tank or the like. The bush may be even more tightly fitting than in known rotary joints, since the fluid supplied to the relieving chamber prevents or reduces friction between the bush and the rotating machine part. Thus, leakage losses are reduced to an acceptable level even at high pressures and with large shaft diameters and/or high relative speeds between the sliding surfaces. As far as possible it is advantageous for the same fluid to be used as relieving fluid as serves as working fluid. This is especially true of fluids with lubricating properties.

In a first embodiment of the invention, the relieving chamber is constructed as an annularly encircling groove, either in the outer or circumferential surface of the shaft or, as is preferred, in the inner surface of the bush. The uniform pressure prevailing in this relieving chamber over the circumference ensures a uniform, if extremely slight, expansion of the bush and also has a certain centering effect between bush and shaft, which may possibly be connected with the fact that the rotating shaft entrains the fluid out of the relieving chamber into the sealing gap along the sliding sealing faces between shaft and bush and/or that the pressure in the broader gap reduces more rapidly towards the leak. The resultant pressure profile has the effect of centering the gap-forming sealing faces on shaft and bush.

In another preferred embodiment of the invention, this relieving groove is subdivided into several separate segments, i.e. several radial feed bores for the relieving fluid are provided, which are each connected with their own relieving chamber or groove extending over a segment of the circumference. At least three such relieving chambers are preferably provided, the centres of which are each staggered by 120° relative to each other and which extend over a circumferential segment of approximately 100 or 110°, for example, while the remaining circumferential segments separate the individual chambers from each other. Similarly, four or more identical chambers could be distributed uniformly and in segments about the circumference of the shaft. The segment-type groove portions may optionally be provided as recesses in the sliding sealing faces in the inner wall of the bush and/or also in the outer wall of the shaft.

In this connection, an embodiment of the rotary joint which is particularly effective is one in which the feed ducts for the relieving fluid, preferably the radial feed bores, each contain a throttle, which is so set or settable that the supply of relieving fluid is very greatly restricted by this throttle and an accumulation of pressure with respect to the feed pressure existing upstream of the throttle occurs in the groove segment supplied with this relieving fluid if the sealing gap between the sliding sealing faces and adjoining this groove segment has a maximum width. If the sealing gap is narrower, the pressure in the corresponding groove segment is correspondingly greater. In this way, the throttling ensures a very good centering effect for the shaft revolving in the bush, since, at the point where the shaft lies more tightly against the sliding sealing faces of the bush and where potentially greater friction and greater friction heat arise, in the groove segment arranged on this side there is a higher pressure than in the other groove segments, which pressure forces the bush away from side of the shaft. The sealing gap adjoining the other groove segments thereby becomes smaller, such that there too a higher pressure builds up, so that finally, in the case of a rotating shaft, a dynamic equilibrium arises and the shaft is optimally centred and exhibits minimum friction with the sliding sealing faces of the bush.

The relieving grooves or groove segments are preferably arranged in pairs and provided in the sliding sealing faces of the bush and/or the shaft in the axial direction on both sides of the feed bores or grooves for working fluid.

Furthermore, decoupling grooves are also provided in the sliding surfaces, preferably of the bush, between the relieving grooves or groove segments and the feed bore or feed groove for working fluid, which decoupling grooves are connected with a leakage duct or a leakage discharge and ensure that the pressurised working fluid does not penetrate through the sealing gap into the grooves or groove segments of the relieving device, thereby impairing or preventing the centering effect of the relieving grooves. The decoupling groove ensures that between the grooves or groove segments of the relieving device and the decoupling groove there is always a pressure difference, i.e. with respect to the leakage chamber, which is greater, the narrower the sealing gap between the sealing faces in the area between the respective groove segment and the relieving groove. Otherwise, the connection, formed by the sealing gap, with the pressure of the working fluid could impair the centering effect of the groove segments. Working fluid which may escape from the feed bore or feed groove for working fluid in the direction of the relieving groove is collected by the decoupling groove and conveyed away to a leakage collecting chamber. Otherwise, the connection, formed by the sealing gap, with the pressure of the working fluid could impair the centering effect of the groove segments.

It goes without saying that the decoupling grooves are also preferably in pairs and separate the grooves for the working fluid from the pairs comprising relieving grooves or groove segments.

The pressure source for the relieving fluid may be fundamentally the same as the pressure source for the working fluid and accordingly working fluid and relieving fluid are also preferably identical. It could accordingly be ensured by means of valves that the fluid supply to the bores and grooves for working fluid may be interrupted, while at the same time the supply to the relieving grooves or groove segments continues and if need be is stopped when the rotating machine part comes to a standstill.

However, it may be advantageous to provide a separate pressure source for the relieving fluid, especially when the pressure source for the working fluid is not designed for a constant pressure or is being changed or when independent control of the pressure in the relieving grooves is deliberately desired.

Further advantages, features and possible applications of the present invention will become apparent from the following description of a preferred embodiment and the associated FIGS. in which:

FIG. 1 shows a longitudinal section, containing the axis, a complete rotary joint according to the present invention;

FIG. 2 shows an axial longitudinal section only through a bush, which shows more detail than may be seen in FIG. 1; and FIG. 3 is a cross section through a bush perpendicular to its axis and in a plane which comprises relieving grooves.

FIG. 1 shows a stationary machine part 1 and a rotating machine part in the form of a shaft 2. The stationary machine part 1 consists essentially of a housing 11 with radial bores 12 and 14 and an axial bore 13, further radial and axial bores being provided outside the cross-sectional plane illustrated. The housing 11 further accommodates two sliding sealing bushes 3, 3', which are arranged with slight radial play inside the housing and which are kept substantially centred and sealed in the housing by resilient O-ring seals 6, but may be resiliently moved in the radial direction when the O-rings are slightly deformed. The O-rings are accommodated in corresponding grooves in the cylindrical inner wall of the housing 11, but it is possible also to provide these grooves in the outer surfaces of the bushes.

The bushes 3, 3' are fixed in their axial position by an inwardly projecting shoulder, not described in any more detail, between the bushes and two circlips, likewise not described in any more detail. Two ball bearings 4 are also arranged in the housing 11 axially externally of the bushes, which ball bearings may primarily absorb radial, but also axial, loads. The closure of the rotary joint is formed in the axial direction by two sliding seals with resilient sealing lips, which rest on the surface of the shaft 2 with only slight force, however, and thus do not cause any great friction or friction heat.

The radial bores 12, 14 in the housing 11 and also the radial bores 31 in the bushes 3, 3' each open on the inside of the housing and the outside and inside of the bushes in encircling grooves 32 and 33 respectively, such that fluid may be conveyed via these bores and the grooves irrespective of the relative positioning of the radial bores 14, 31 in the circumferential direction in the housing or the grooves. Likewise, fluid is conveyed from the bore 31 via the groove 32 into the radial and axial bores 22, 23 in the shaft 2, such that again it does not depend on the position thereof in the circumferential direction.

The two bushes 3 and 3' are identical with respect to the supply of working fluid and all other, above-described features. However, the bush 3 is distinguished from the bush 3' by a relieving device, which is formed by grooves 34 and additional radial bores 5 in the bush 3, via which pressurised relieving fluid is supplied. It goes without saying that the bush 3' could also be provided with a corresponding relieving device, but the combination of a bush 3 with relieving device and a bush 3' without relieving device, as shown in the embodiment according to FIG. 1, is also sensible for certain applications, if, for example, the working fluid (for example water acting as rinsing medium) supplied through the bores 14, 31 and thus through the bush 3' is or has to be supplied under substantially lower pressure than the working fluid (e.g. hydraulic oil) supplied through the bush 3. In this case, the sliding sealing faces between the bush 3', i.e. the cylindrical surface 38 thereof, and the circumferential surface of the shaft 2 may be produced with somewhat greater play in this area, because even with relatively large sealing gaps only a slight leakage flow runs off owing to the low pressure of the fluid supplied, such that in this case the friction arising and the friction heat are lower. Even if the pressure of the working fluid is permanently high, it is optionally possible to dispense with the separate relief, because the fluid penetrating into the sealing gap also has a similar effect to the fluid supplied from a separate, encircling relieving groove. The relieving device is necessary, however, or at least sensible, if the relative speeds of the surfaces sliding against each other and the pressure of the working fluid are very high, but can also occasionally exhibit low values, i.e. especially in the case-of very rapidly rotating shafts or in the case of moderately rapidly rotating shafts with large diameters, which have, for example, to be supplied with hydraulic oil or the like which is occasionally under very high pressure but is often or sometimes also under very low pressure. The relieving fluid is conveyed via the axial bore 13 and the radial bore 12 in the housing to the radial bores 5 in the bush 3, wherein here also grooves 35 encircling the inner surface of the housing 11 at the orifice of the radial bore 12 again ensure supply of the fluid irrespective of the position of the bore 5 in the circumferential direction.

The relieving bores in turn open on the inside of the bush 3 in encircling grooves 34 or in groove segments, each groove segment then being supplied via its own radial feed bore 5. Further details of such an embodiment are shown in FIGS. 2 and 3. FIG. 2 again shows a bush 3, in the same sectional plane as is the case in FIG. 1 but without housing 11 and shaft 2, the sectional plane passing through two diametrically opposed feed bores 31 for working fluid. This feed bore 31 opens on the inside of the bush 3 into an encircling groove 32, from which fluid may pass into the radial bore 23 in the shaft 2 shown in FIG. 1.

The relieving device is provided in pairs on both sides of the feed bores and grooves for the working fluid, but in FIG. 2 it is only provided with reference numerals on the right-hand side and is described below. In detail, the relieving device comprises three bores 5 which are staggered relative to each other at circumferential distances of 120° and each open on the inside into a groove segment 34'. In each of the bores 5 there is arranged a throttle 7, which may optionally be adjustable.

The sealing gap 40 between the outer circumferential cylindrical surface 28 of the shaft 2 and the inner cylindrical surface 38 of the bush 3 is shown very exaggeratedly in FIG. 3. In fact, the surfaces 28, 38 adjoin each other with a precise fit and a narrow sealing gap, but the pressure in the groove segments 34' ensures a certain expansion of the bush 3 and reduces the frictional engagement between the surfaces 28, 38. This is the precise purpose of the relieving device, this relieving effect and the reduction in friction being clearly noticeable even when, instead of a plurality of groove segments 34', a single encircling groove is provided for which only a single feed bore 5 need accordingly be provided. The throttle 7 could then also be dispensed with.

The three groove segments 34' or the relieving fluid accommodated under pressure therein additionally exert a centering action on the shaft 2. This, of course, requires the throttles 7 to be so adjusted that a marked reduction in pressure occurs in the chamber 34' because of the fluid flowing off through the sealing gap 40, if, owing to radial displacement of the shaft 2 relative to the bush 3, the sealing gap 40 adjoining the relevant groove segment 34' in the axial direction expands. If, conversely, the shaft 2 is displaced in the direction of one of the groove segments 34' by exploiting the available radial play, the sealing gap 40 adjacent in this area diminishes in size, so that accordingly less relieving fluid is able to escape through the sealing gap 40 and the relieving fluid flowing under pressure through the throttle 7 increases the pressure in this groove segment 34' until an equilibrium is reached between the fluid flowing off through the sealing gap and the fluid flowing through the throttle 7. If the pressure in one of the groove segments 34' increases in relation to the other two groove segments 34', the higher pressure in the first groove segment 34' ensures radial displacement of the shaft 2 towards the centre. In this way, the pressure in the first groove segment 34' is lowered and increased in the other two segments 34' and an equilibrium is finally reached, at which the shaft 2 is optimally centred. Although slight fluctuations and vibrations of the shaft 2 about the ideally centred position may occur, the friction arising between the surfaces 28, 38 is altogether minimised by this centering effect.

A further feature, not visible in FIG. 1, of the bush 3 is in the form of a pair of decoupling grooves 36, of which, once again, only that present in the right-hand half of FIG. 2 is provided with reference numerals and described.

The left-hand half of the bush 3 is constructed as a mirror image of the right-hand half. The decoupling groove 36 provided on the inner surface of the bush 3 and specifically as a recess in the sealing face 38 is arranged in the axial direction between the feed groove 32 for the working fluid and the groove segments 34' for the relieving fluid. This relieving groove 36 is connected with bores or ducts 37 which extend radially and axially in the bush 3 and lead to leakage collecting chambers 26' shown in FIG. 1, which lead via bores 26 in the housing 1 to a leakage tank 8.

As may be seen in FIG. 2, approximately ⅔ of the sliding sealing face 38 of the bush 3 is covered by the relieving fluid, which, starting from the groove segments 34', escapes either via the decoupling groove 36 or the front end of the bush 3 into the leakage collecting chamber 26'. By way of approximation, it may be assumed that the pressure drops as the relieving fluid travels from the groove segment 34' to the relieving groove 36 or to the free front end of the groove 3 in approximately linear relationship with the distance to the groove segment 34', while in the area of the groove 34 or 34' itself the full pressure prevails. Thus, in the centre somewhat more than half the pressure prevailing in the groove segment 34' acts on the surface loaded by the relieving fluid. If working fluid is additionally supplied through the bore 31 and the feed groove 32, a leakage flow of this working fluid runs off via the sealing gap between the face 38 and the shaft to the decoupling groove 36 and also loads this part of the sealing face 38 with corresponding pressure. This additionally contributes to a reduction in friction between the sliding sealing faces 38, 28, the pressure exerted by the segments 34' and the adjacent portions of the sealing gap 40 additionally effecting centering of the shaft 2. With such an embodiment it is possible to operate rotary joints at high speeds or joint radii and very high transmission pressure, without excessively high losses of working fluid arising in the sealing gap 40. The embodiment according to the invention with separate relieving grooves or groove segments has the effect that the bushes may be conformed to the circumference of the shaft with relatively tight tolerances, whereby the leakage flow is kept to a minimum even at high transfer pressures, the pressure relief device nevertheless helping at the same time to prevent the occurrence of excessive friction or friction heat. Additional friction-reducing effects may of course be achieved by conventional measures, such as special sliding surface coatings for example. Thus, for example, the circumferential surface of the shaft could be provided with a ceramic layer, while the inner surface 38 of the bush could be specially lined with an anti-friction alloy.

What is claimed is:

1. A rotary joint for the transfer of pressurized working fluid between a stationary machine part (1) and a rotating machine part (2), comprising a housing (11) associated with the stationary machine part (1), a shaft (2) associated with the rotating machine part, which shaft (2) extends into the housing (11), at least one bush (3) accommodated in the housing (11), which bush (3) tightly surrounds the shaft (2), the inner surface of the bush (3) and the circumferential surface of the shaft (2) being provided with sealing faces (38, 28) which slide against each other, and the bush (3) comprising at least one radial fluid feed bore (31) which is connected, via an annular channel (32) encircling the shaft (2), with at least one radial bore (23) in the shaft (2) for conveying pressurized working fluid through the bush (3) to a fluid duct (22) which extends axially in the shaft (2) and is connected with the radial bore (23) in the shaft (2), characterised in that the bush (3) is radially resiliently movable within the housing (11) and includes at least one radial bore (5) separate from the fluid feed bore (31), which radial bore (5) extends to a relieving channel (34) encircling the shaft (2), the relieving channel (34) being adapted to be loaded with pressurized fluid.

2. A rotary joint according to claim 1, characterised in that the relieving channel is constructed as an annularly encircling groove (34) formed in the inner surface of the bush (3).

3. A rotary joint according to claim 1, characterised in that the bush comprises a plurality of radial bores (5), which are arranged in various circumferential portions and which are each connected with a chamber extending over a circumferential segment.

4. A rotary joint according to claim 3, characterised in that a throttle device (7) is provided in the fluid supply for each of the chambers (34').

5. A rotary joint according to claim 2, characterised in that a radial bore is provided in the axial direction on both sides of the fluid feed bore provided for the working fluid.

6. A rotary joint according to claim 1, characterised in that an annularly encircling decoupling groove (36) is provided between the and the fluid feed bore, which decoupling groove (36) is open to the outside or is connected with a leakage collecting chamber (8) via bores (37).

7. A rotary joint according to claim 3, characterised in that the relieving chambers are loaded from the same pressure source as is provided for the working fluid supply.

8. A rotary joint according to claim 1, characterised in that a separate pressure source is provided for the radial bore, which pressure source preferably supplies the same working fluid as is also supplied to the fluid feed bore (31) for working fluid.

9. A rotary joint according to claim 1, characterised in that the relieving channel (34) is formed on the inner surface of the shaft (2).

10. A rotary joint according to claim 1, characterised in that the relieving channel is formed on the outer surface of the bush.

11. A rotary joint according to claim 1, characterised in that the annular channel (32) is formed in the circumferential surface of the shaft (2).

12. A rotary joint according to claim 1, characterised in that the annular channel (32) is formed in the inner surface of the bush (3).

13. A rotary joint according to claim 1, characterised in that the shaft (2) extends through the housing (11).

* * * * *

UNITED STATES PATENT AND TRADEMARK OFFICE
CERTIFICATE OF CORRECTION

PATENT NO. : 6,073,970
DATED : June 13, 2000
INVENTOR(S) : Ott et al.

It is certified that error appears in the above-identified patent and that said Letters Patent is hereby corrected as shown below:

<u>Column 8,</u>
Line 2, "with scaling faces" should read -- with sealing faces --.
Line 32, "between the and the" should read -- between the relieving channel (34) and the --.

Signed and Sealed this

Seventh Day of August, 2001

Attest:

NICHOLAS P. GODICI
*Attesting Officer*     *Acting Director of the United States Patent and Trademark Office*